(12) United States Patent
Maiman et al.

(10) Patent No.: US 11,455,506 B1
(45) Date of Patent: Sep. 27, 2022

(54) TRANSACTION CARD WITH FOLDABLE LIVING HINGE

(71) Applicant: Capital One Services, LLC, McLean, VA (US)

(72) Inventors: Tyler Maiman, Melville, NY (US); Kathryn Tikoian, Arlington, VA (US); Bryant Yee, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/359,794

(22) Filed: Jun. 28, 2021

(51) Int. Cl.
*G06K 19/077* (2006.01)

(52) U.S. Cl.
CPC ................. *G06K 19/0772* (2013.01)

(58) Field of Classification Search
CPC ........... G06K 19/077; G06K 19/07732; G06K 19/07733; G06K 19/07722; G06K 19/0723; G06K 19/041; G06K 19/072; G06K 19/07739; G06K 19/07741; G06K 19/07743
See application file for complete search history.

(56) References Cited

U.S. PATENT DOCUMENTS

| | | | |
|---|---|---|---|
| 5,700,037 A | 12/1997 | Keller | |
| 5,710,421 A * | 1/1998 | Kokubu | G06K 19/077 235/492 |
| 7,520,439 B1 | 4/2009 | Gandel et al. | |
| 7,721,956 B2 | 5/2010 | Williams et al. | |
| 10,803,371 B1 | 10/2020 | Maiman et al. | |
| 2002/0040935 A1 * | 4/2002 | Weyant | G06K 19/07737 235/487 |
| 2009/0039154 A1 * | 2/2009 | Williams | G06K 19/06196 235/487 |

* cited by examiner

*Primary Examiner* — Thien T Mai
(74) *Attorney, Agent, or Firm* — KDB

(57) ABSTRACT

Provided are foldable transaction cards with a living hinge. In some approaches, a transaction card may include a body including a first main side opposite a second main side, wherein an identification chip is coupled to the body, and wherein a living hinge connects a first section of the body and a second section of the body. The living hinge may extend between the first and second main sides of the body, wherein the first and second sections of the body are pivotable about the living hinge between a stowed configuration and a deployed configuration.

17 Claims, 7 Drawing Sheets

TRANSACTION CARD WITH FOLDABLE LIVING HINGE

FIELD

Embodiments of the present disclosure relate to transaction cards and, more particularly, to transaction cards including a foldable living hinge.

BACKGROUND

Transaction cards, such as credit and debit cards, have become a primary means for individuals to complete transactions involving data exchange. Many other forms of cards are also widely used, such as identification cards, loyalty cards, prescription cards, insurance cards, etc. These forms of transaction cards are typically formed of a thin and substantially flat plastic substrate that can easily be swiped through a card reader, stored in a wallet or purse, or the like.

In some instances, it may be desirable to fold a transaction card into a more compact configuration without damaging the transaction card. It is with respect to this and other considerations that the present disclosure is provided.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In at least one approach according to the disclosure, a transaction card may include a body including a first main side opposite a second main side, wherein an identification chip is coupled to the body, and a living hinge connecting a first section of the body and a second section of the body. The living hinge may extend between the first and second main sides of the body, wherein the first and second sections of the body are pivotable about the living hinge between a stowed configuration and a deployed configuration.

In another approach according to the disclosure, a transaction card may include a body having a first main side opposite a second main side, wherein an identification chip is coupled to the first main side of the body. The transaction card may further include a living hinge connecting a first section of the body and a second section of the body, wherein the living hinge extends between the first and second main sides of the body, wherein the first and second sections of the body are pivotable about the living hinge between a stowed configuration and a deployed configuration, and wherein in the deployed configuration the first and second sections of the body are coplanar with one another.

In yet another approach according to the disclosure, a transaction card, may include a body including a first main side opposite a second main side, wherein an identification chip is coupled to the first main side of the body. The transaction card may further include a living hinge between a first section of the body and a second section of the body, the living hinge including a first indentation in the first main side and a second indentation in the second main side, wherein the first and second indentations extend towards one another, and wherein the first and second sections of the body are pivotable about the living hinge between a stowed configuration and a deployed configuration in which the first and second sections of the body are coplanar with one another.

BRIEF DESCRIPTION OF THE DRAWINGS

The accompanying drawings illustrate example approaches of the disclosure, including the practical application of the principles thereof, as follows.

Figure 1A:
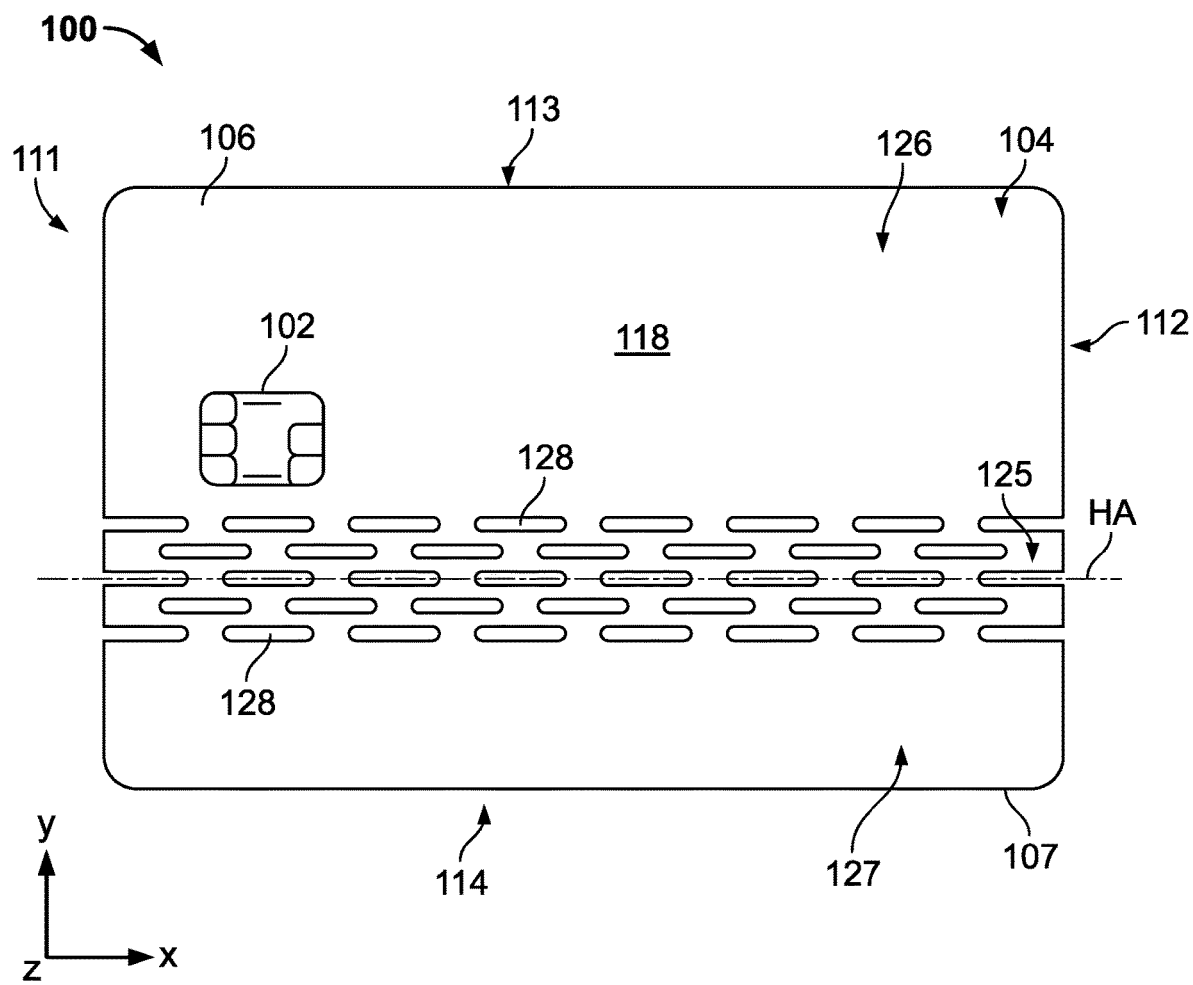
FIG. 1A is a top/front view of a transaction card, in accordance with embodiments of the present disclosure.

The drawings are not necessarily to scale. The drawings are merely representations, not intended to portray specific parameters of the disclosure. The drawings are intended to depict example embodiments of the disclosure, and therefore are not be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, some reference numbers may be omitted in certain drawings.

DETAILED DESCRIPTION

The present embodiments will now be described more fully hereinafter with reference to the accompanying drawings, where some embodiments are shown. The subject matter of the present disclosure may be embodied in many different forms and are not to be construed as limited to the embodiments set forth herein. These embodiments are provided so this disclosure will be thorough and complete, and will fully convey the scope of the subject matter to those skilled in the art. In the drawings, like numbers refer to like elements throughout.

Embodiments herein are directed to transaction cards including one or more living hinges to enable the transaction card to be folded and stowed away. The living hinge is easily implemented in the manufacturing process of transaction cards, giving the card foldable functionality without adding any additional parts or significant cost. In some examples, the living hinge is provided horizontally through the middle of the body of the transaction card to avoid interrupting the essential payment components, such as the EMV chip and/or magnetic strip.

Figure 1B:
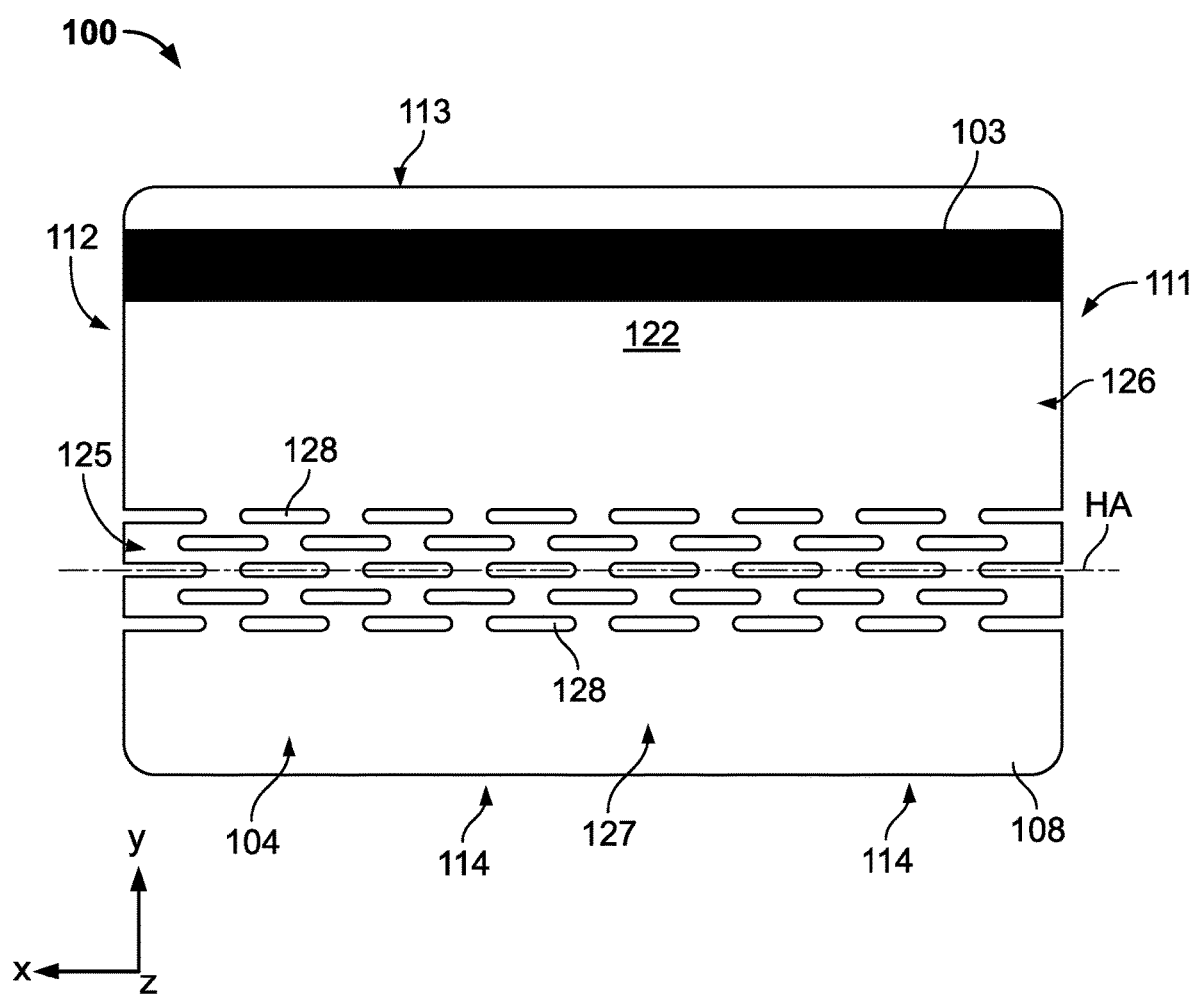
FIG. 1B is a bottom/back view of the transaction card of FIG. 1A, in accordance with embodiments of the present disclosure.

Referring now to FIGS. 1A-1B, an example transaction card (hereinafter "card") 100 according to embodiments of the disclosure will be described. Transaction cards include, but are not limited to, credit cards, debit cards, gift cards, rewards cards, frequent flyer cards, merchant-specific cards, rewards cards, travel cards (e.g., a train pass, a bus pass, etc.), discount cards, insurance cards, identification cards, and driver's licenses. Described sometimes herein as contactless due to the method of communication by an identification chip 102, such as an EMV chip, the card 100 may also provide one or more functions requiring contact. For example, the card 100 may include a magnetic stripe 103 and/or a microchip connected to contacts present on an outer layer of the card 100.

As shown, a body 104 of the card 100 may include a first main side 106 opposite a second main side 108. Although non-limiting, the first main side 106 may correspond to a front or top side of the card 100, while the second main side 108 may correspond to a back or bottom side of the card 100. The body 104 may be defined by a perimeter 107 including a first side 113 opposite a second side 114 and a first end 111 opposite a second end 112. As shown, a first dimension (e.g., length, along x-direction) extending between the first and second ends 111, 112 is greater than a second dimension (e.g., height, along y-direction) extending between the first and second sides 113, 114.

In some embodiments, the magnetic stripe 103 may be provided on the second main side 108 of the body 104, wherein the magnetic stripe 103 is part of a second exterior layer 122. In other embodiments, the magnetic stripe 103 is part of a separate component or layer disposed atop or beneath the second exterior layer 122. The magnetic stripe 103 may contain cardholder data in accordance with standard protocols. For example, in some embodiments, the magnetic stripe 103 includes three tracks, often designated as track 1, track 2, and track 3. Many payment cards, such as credit cards or debit cards, have a magnetic stripe that includes two tracks, such as a magnetic stripe that includes tracks 1 and 2. Many card readers can read a magnetic stripe that includes three tracks, and in cases where the payment card includes a magnetic stripe with only two tracks, the card reader's ability to read a third track is unused. In non-limiting embodiments, when the magnetic stripe 103 is encoded with account data of the card 100 using two tracks, the account data of the card 100 can be encoded in tracks 1 and 2. Track 3 of the magnetic stripe 103 may be unused and devoid of valid data in such a situation.

Although not shown, the second main side 108 of the card 100 may include additional identifying indicia. For example, additional identifying indicia may include a card verification value (CVV), such as a 3-digit number. Depending on the type of card, the additional identifying indicia may be present on or near a signature strip. The first main side 106 of the card 100 may include a first exterior layer 118 containing identifying indicia, such as an account holder name and/or a card number. Although non-limiting, the card number may be a 16-digit number (e.g., four groups of four digits). In other embodiments, the card number may include a different number of digits. The identifying indicia may be printed over/on the first exterior layer 118. However, one skilled in the art will appreciate that the printing of the identifying indicia, along with any other indicia, logos, etc., may be applied to any surface or layer of the card 100. Moreover, any suitable printing, scoring, imprinting, marking or like method is within the scope of the present disclosure.

As further shown, the identification chip 102 may be coupled (e.g., recessed or partially embedded) to the first main side 106 of the card 100. As used herein, the identification chip 102 may be any microprocessor device configured to exchange data electromagnetically, such as an EMV or RFID chip. The RFID chip may include a radio frequency inductor, volatile or non-volatile memory storage, a microprocessor, circuitry logic, and/or an antenna. While in some embodiments electromagnetic data communications from the RFID chip will take place at radio frequencies, other embodiments may exchange electromagnetic data at different frequencies.

The card 100 may be made from one or more thermoplastics including, but not limited to, polyvinyl chloride (PVC), polyester, polypropylene, polyethylene, or polycarbonate. Various other materials may also be used, including, but not limited to, soft touch plastic, metal (e.g., aluminum), fiber composite materials, resin, etc. In some embodiments, the card 100 may include additional material features, such as coverings (e.g., a silicone overmold), veneers (e.g., a wooden veneer), finishes (e.g. an oil-slick aluminum finish), or the like. In embodiments where a body 104 of the card 100 is formed of multiple layers or card substrates, each card substrate may be formed of the same material. Alternatively, one or more card substrates may be formed of a different material. For example, the rear card substrate may be formed of a plastic, such as polycarbonate (PC), whereas the front card substrate may be formed of a separate material, such as aluminum.

The card 100 may further include a living hinge 125 (hereinafter "hinge") connecting a first section 126 of the body 104 and a second section 127 of the body 104, wherein the first and second sections 126, 127 are pivotable about the hinge 125 between a stowed configuration and a deployed configuration of the card 100. As used herein, "living hinge" may refer to any flexible hinge made from the same material as one or more layers of the first and second sections 126, 127 of the body 104. In some embodiments, the hinge 125 may include a plurality of slots 128 extending entirely or partially between the first and second main sides 106, 108 of the body 104. As shown, the hinge 125 may extend between the first and second ends 111, 112 of the body 104. Although non-limiting, a hinge axis (HA') may be parallel to the magnetic stripe 103 and to the first and second sides 113, 114. In some embodiments, the hinge 125 may be made from one or more types of thermoplastics (e.g., polypropylene or polyethylene), which offer repeated folding without damage to the body 104.

Figure 1C:
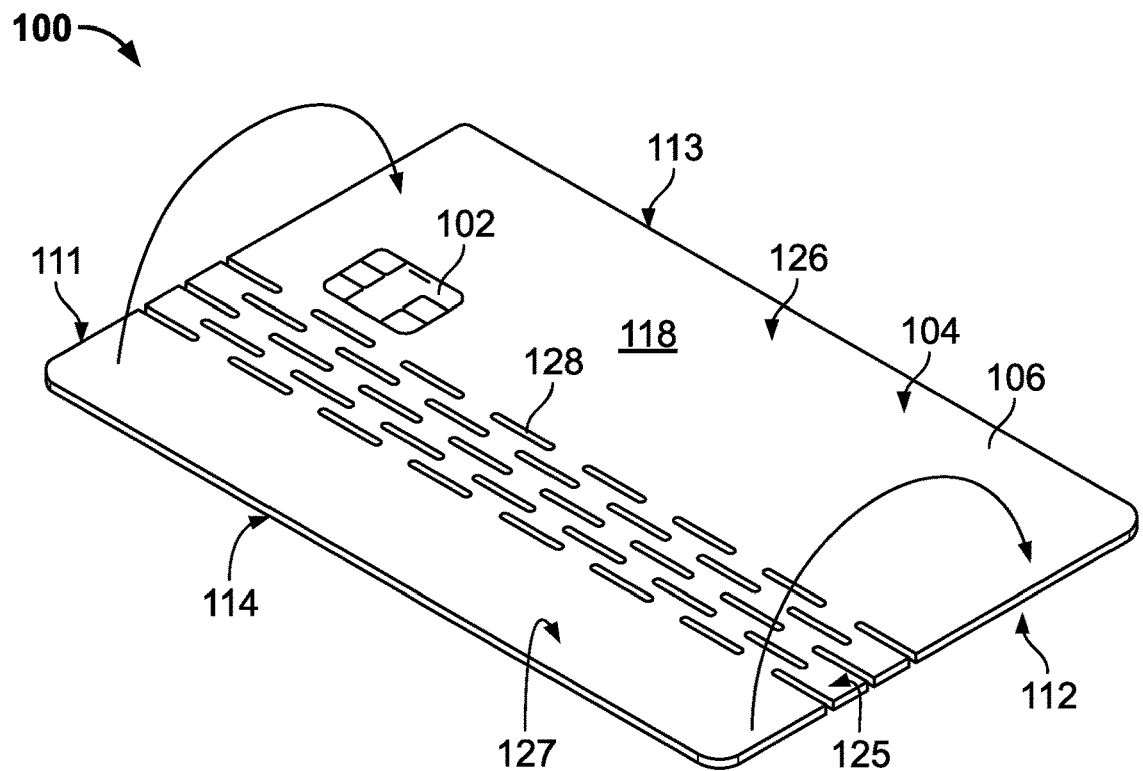
FIGS. 1C-1D are perspective views of the transaction card of FIG. 1A during operation, in accordance with embodiments of the present disclosure.
Figure 1D:
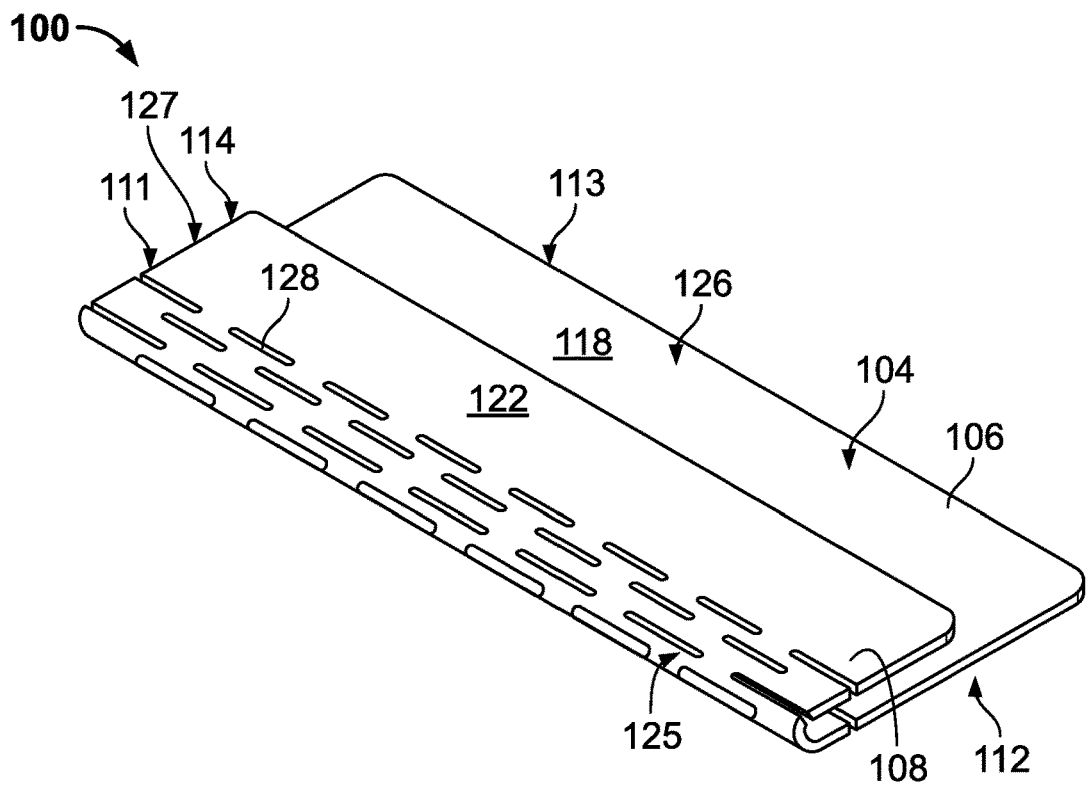

The body 104 may define a card thickness and a hinge thickness (e.g., in the z-direction) between the first main side 106 and the second main side 108. In some embodiments, the hinge thickness is less than the card thickness. Furthermore, the hinge 125 may be more flexible than the first and second sections 126, 127 of the body 104 to allow the hinge 125 to rotate the body 104 between the deployed position, shown in FIG. 1C, to the stowed position, shown in FIG. 1D. When the card 100 is brought into the stowed position, the first and second sections 126, 127 may extend parallel to one another. In the deployed configuration, the first and second sections 126, 127 are coplanar with one another.

Figure 2A:
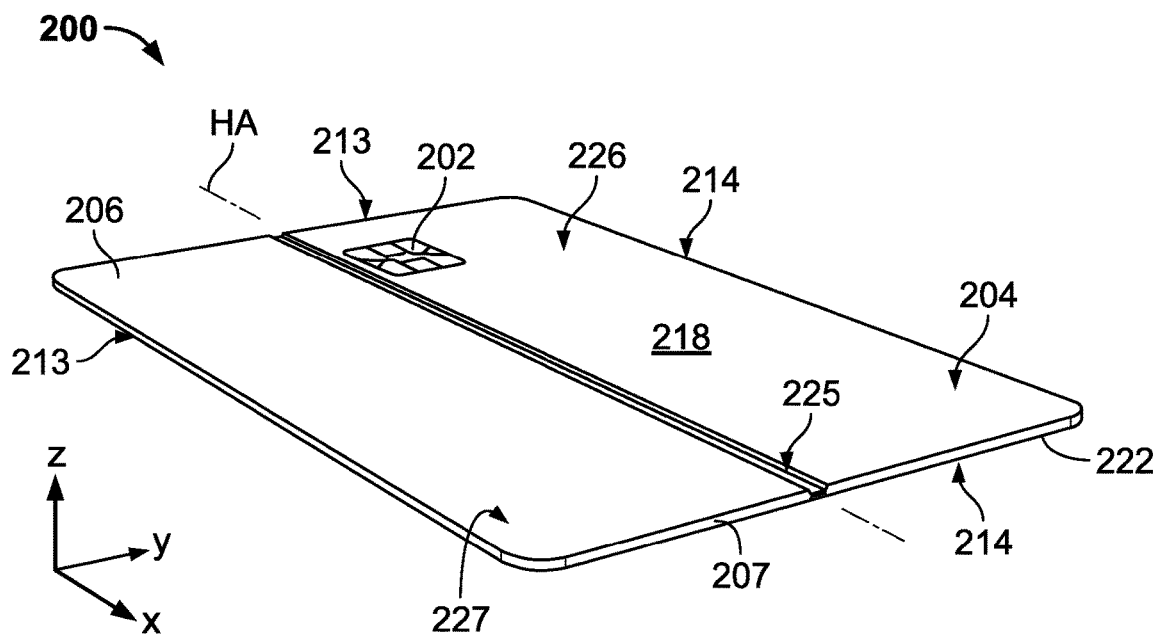
FIG. 2A is a perspective view of a transaction card, in accordance with embodiments of the present disclosure.

FIG. 2A demonstrates a card 200 according to another embodiment of the present disclosure. The card 200 may be the same or similar to the card 100 described herein. As such, only certain aspects of the card 200 will hereinafter be described for the sake of brevity. As shown, a body 204 of the card 200 may include a first main side 206 opposite a second main side 208. The body 204 may be defined by a perimeter 207 including a first side 213 opposite a second side 214 and a first end 211 opposite a second end 212. The first main side 206 of the card 200 may include a first exterior layer 218, while the second main side 208 may include a second exterior layer 222. In some embodiments, a magnetic stripe (not shown) may be part of the second exterior layer 122, while an identification chip 202 may be part of, or attached to, the first exterior layer 218.

The card 200 may further include a living hinge 225 (hereinafter "hinge") connecting a first section 226 of the body 204 and a second section 227 of the body 204, wherein the first and second sections 226, 227 are pivotable about the hinge 225 between a stowed configuration and a deployed configuration. As shown, the hinge 225 may extend to the perimeter 207 of the body 204, between the first end 211 and the second end 212. Although non-limiting, a hinge axis (HA') may be parallel to the magnetic stripe and to the first and second sides 213, 214. In some embodiments, the hinge 225 may be made from polypropylene or polyethylene.

Figure 2B:
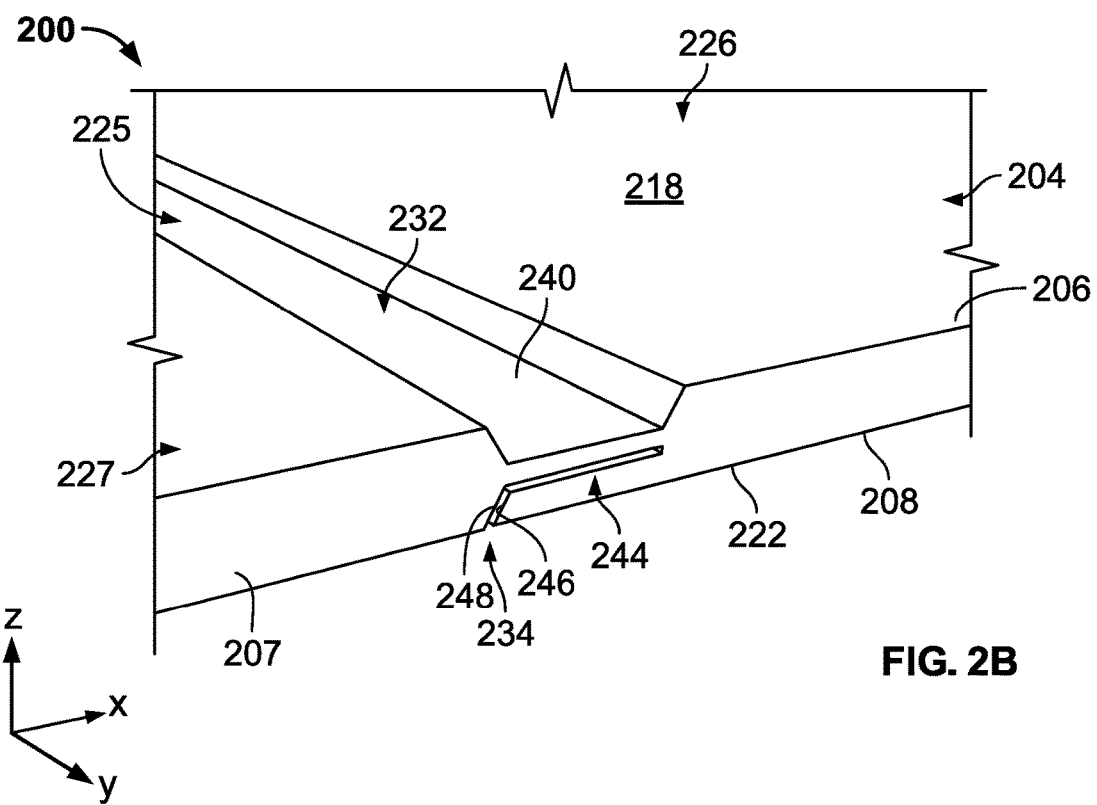
FIGS. 2B-2C are close-up perspective views of a living hinge of the transaction card of FIG. 2A, in accordance with embodiments of the present disclosure.
Figure 2C:
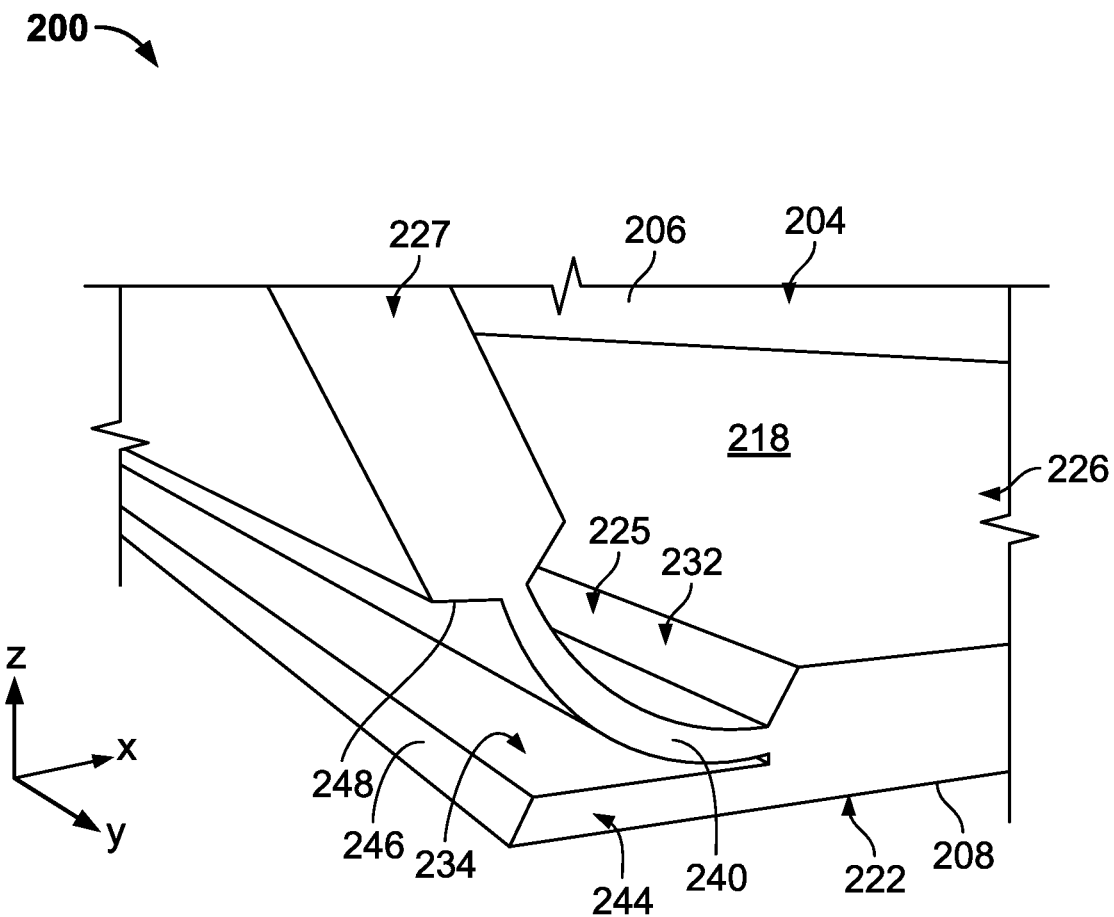

As better shown in FIGS. 2B-2C, the hinge 225 may include a first recess or indentation 232 in the first main side 206 and a second recess or indentation 234 in the second main side 208, wherein the first and second indentations 232, 234 extend towards one another. In some embodiments, the hinge 225 may include a middle layer 240 between the first exterior layer 218 of the first main side 206 and the second exterior layer 222 of the second main side 208. As shown, the middle layer 240 may act as a connector or bridge between interior portions of the first and second sections 226, 227. A hinge thickness (e.g., along the z-direction) of the middle layer 240 may be less than a card thickness of the first and second sections 226, 227 of the body 204. Furthermore, the middle layer 240 may be more flexible than the first and second sections 226, 227 of the body 204 to allow the first and second sections 226, 227 to rotate between stowed and deployed positions. In a deployed position, a first plane defined by the first main side 206 of the body 204 may be parallel to a middle plane defined by an exterior surface of the middle layer 240. Furthermore, in the deployed configuration, the first and second sections 226, 227 may be coplanar with one another. Although non-limiting, the middle layer 240 may be made from polypropylene or polyethylene.

The hinge 225 may be formed in various ways. For example, the hinge 225 and the body 204 may be molded together using a molding process (e.g., injection molding, etc.). Accordingly, the middle layer 240, the first section 226, and the second section 227 may comprise a unitary section of material. In other embodiments, the first and/or second indentations 232, 234 may be formed by cutting, etching, or otherwise removing material from the body 204. For example, where the body 204 comprises multiple layers or card substrates, the first exterior layer 218 and the second exterior layer 222 may each be formed as a substantially planar card layer. The hinge 225 may be formed by removing material along the length of the first exterior layer 218 and the second exterior layer 222, respectively. The removed material (e.g., by cutting, etc.) may extend partially into the thickness of the body 204, leaving the middle layer 240 formed to a desired thickness.

As further shown, the hinge 225 may include a stiffening feature 244 adjacent the middle layer 240. In some embodiments, the stiffening feature 244 is coupled to, or an integral extension of, the second exterior layer 222 of the second main side 208. In other embodiments, the stiffening feature 244 is coupled to, or an integral extension of, the first exterior layer 218 of the first main side 206. As shown, the stiffening feature 244 may extend across the second indentation 234, towards the second section 227. In some embodiments, the stiffening feature 244 may be substantially coplanar with first main side 206 or the second main side 208. More specifically, an exterior side of the stiffening feature 144 may be coplanar with the second exterior layer 222 of the second main side 208 of the body 204. In some embodiments, the stiffening feature 244 may include a tip having an angled free end surface 246 operable to engage or abut a corresponding angled surface 248 of the second section 227. For example, the angled free end surface 246 may abut one of the pair of angled sidewalls defining the second indentation 234 when the first and second sections 226, 227 of the body 204 are in the deployed configuration. As a result, the stiffening feature 244 may provide rigidity and prevent over rotation of the first and second sections 226, 227 of the body 204.

Figure 2D:
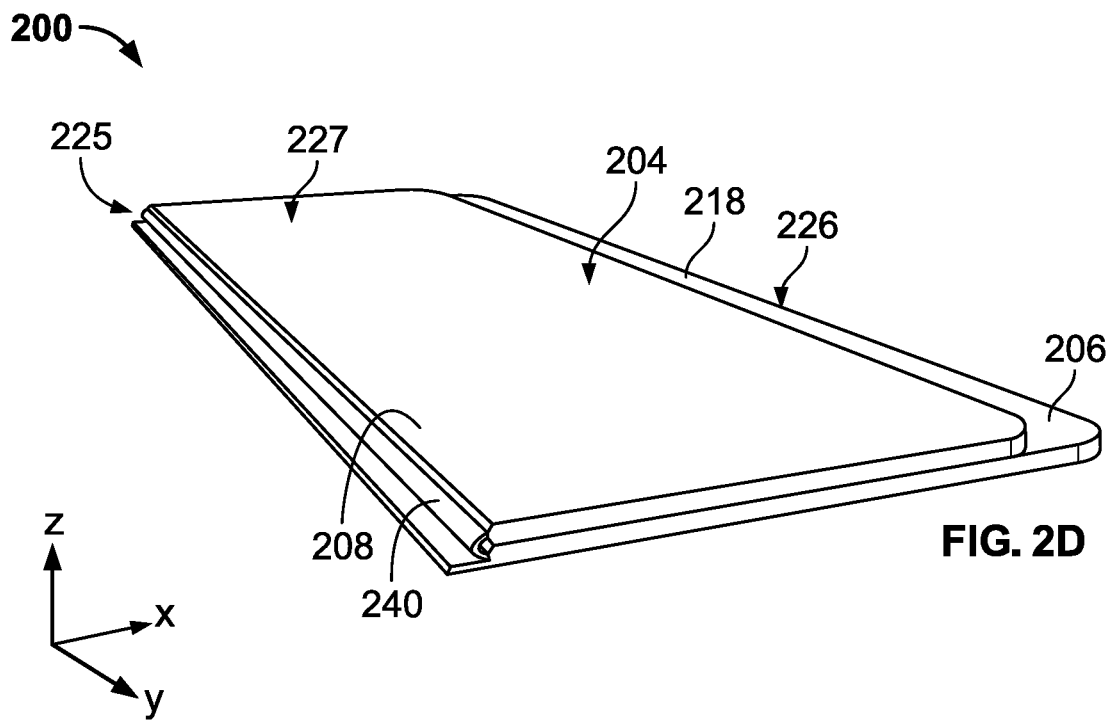
FIG. 2D is a perspective view of the transaction card of FIG. 2A, in accordance with embodiments of the present disclosure.

The hinge 225 permits the card 200 to be folded from a deployed configuration, as shown in FIG. 2B, to a stowed position, as shown in FIG. 2D. More specifically, when the card 200 is brought into the stowed position, the first and second sections 226, 227 may extend parallel to one another. In some embodiments, the second section 227 lays atop the first exterior layer 218 of the first main side 206 when the card 200 is in the stowed position.

Figure 3A:
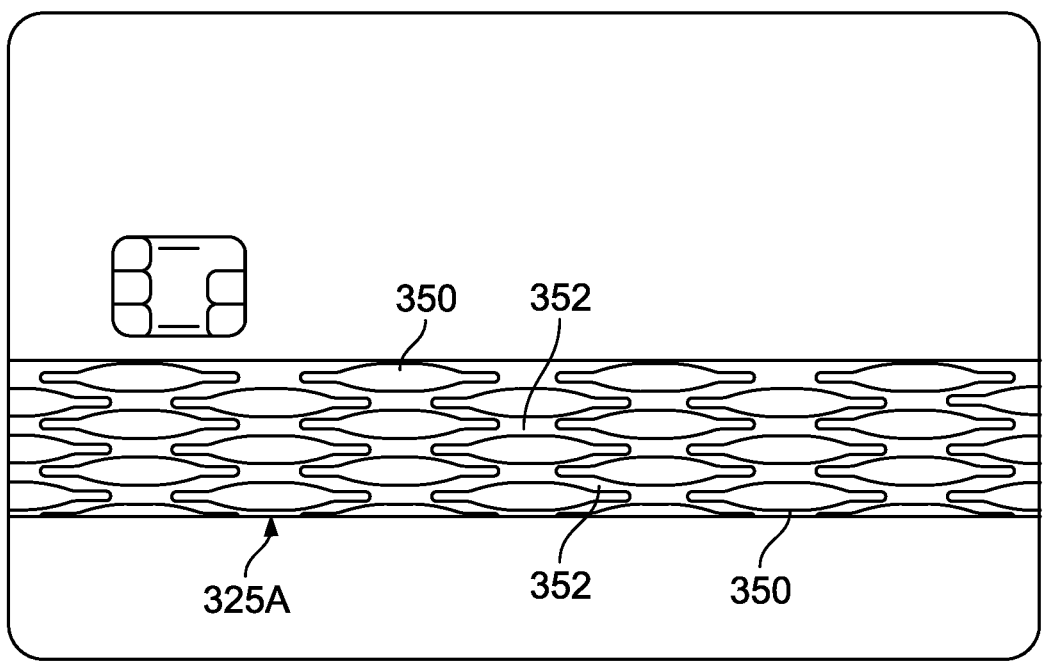
FIGS. 3A-3D are top/front views of various transaction cards, in accordance with embodiments of the present disclosure.

It will be appreciated that a variety of different types and configurations of living hinges are possible in accordance with embodiments of the present disclosure. For example, as shown in FIG. 3A, a transaction card 300A may include a living hinge 325A defined by a plurality of substantially diamond-shaped openings or cutouts 350 and connectors 352. Dimensions of the connectors 352 can be varied depending on a desired performance of the living hinge 325A.

Figure 3B:
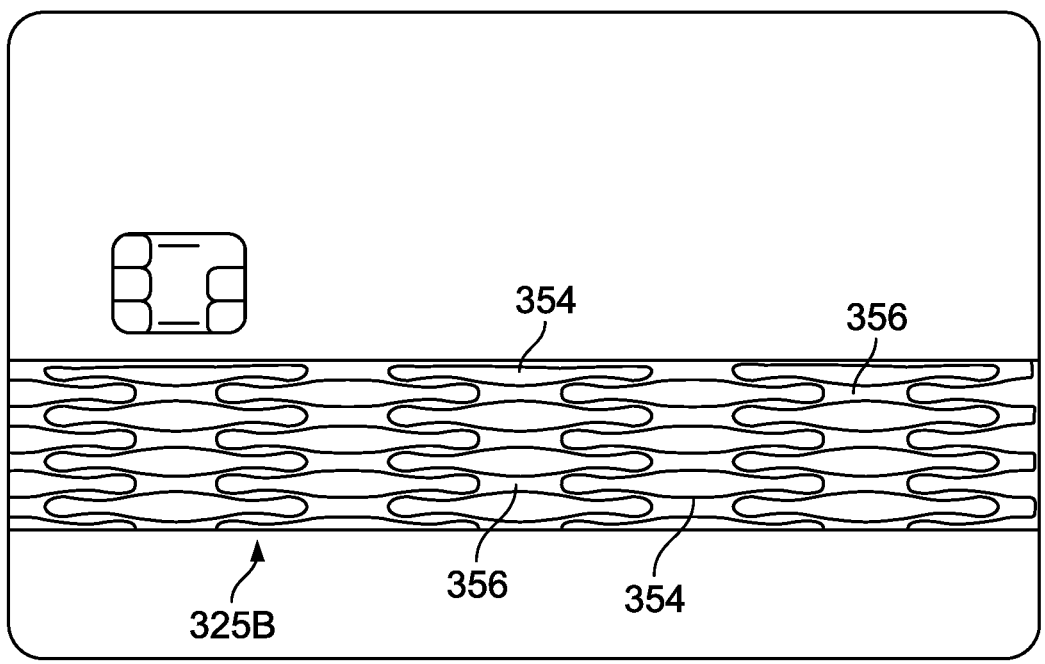
Figure 3C:
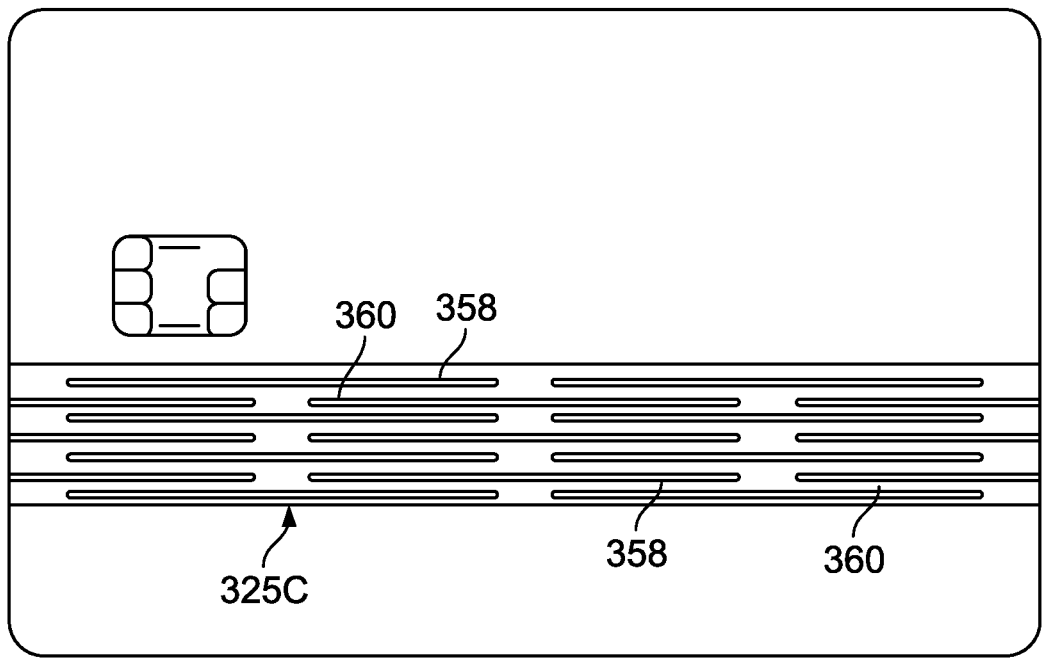
Figure 3D:
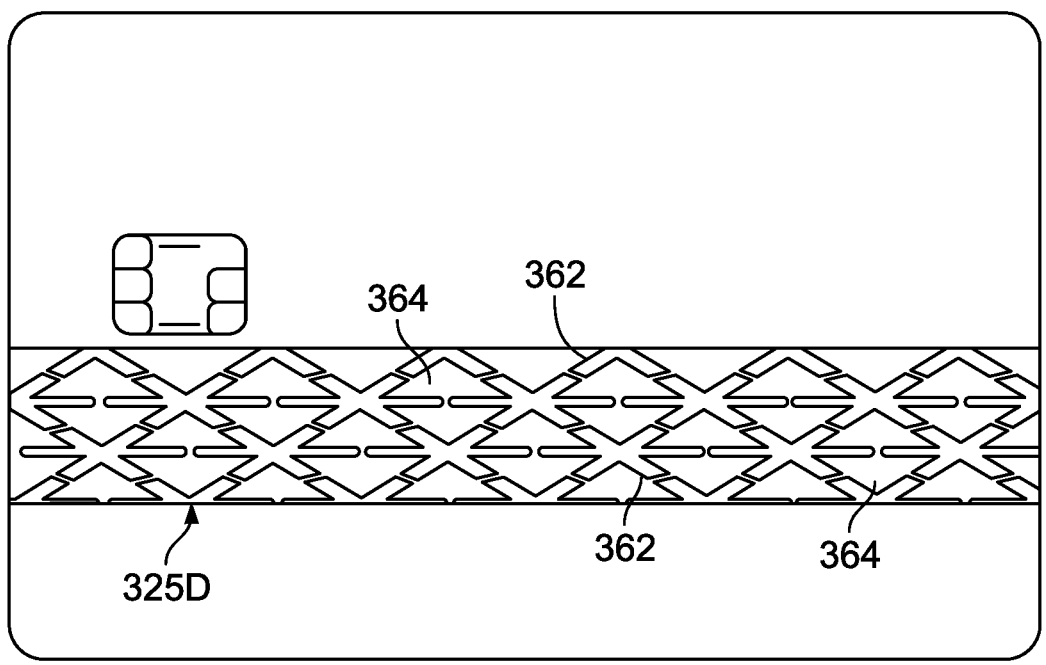

Meanwhile, FIG. 3B demonstrates a transaction card 300B including a living hinge 325B defined by a plurality of rolling pin-shaped openings or cutouts 354 and connectors 356. FIG. 3C demonstrates a transaction card 300C including a living hinge 325C defined by a plurality of slits or cutouts 358 and connectors 360. FIG. 3D demonstrates a transaction card 300D including a living hinge 325D defined by a plurality of triangular-shaped openings or cutouts 362 and connectors 364. Embodiments herein are not limited in this context.

The foregoing discussion has been presented for purposes of illustration and description and is not intended to limit the disclosure to the form or forms disclosed herein. For example, various features of the disclosure may be grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The term "adhesive" used herein may refer to any type of substance used for sticking objects or materials together and may be classified in a variety of ways depending on their chemistries (e.g. epoxies, polyurethanes, polyimides), their form (e.g. paste, liquid, film, pellets, tape), their type (e.g. hot melt, reactive hot melt, thermosetting, pressure sensitive, contact, etc.), or their load carrying capability (structural, semi-structural, or non-structural).

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Furthermore, identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary. Although non-limiting, the card 100 and the card 200 described herein may have standardized dimensions. For example, ISO/IEC 7816 is an international standard related to electronic identification cards with contacts, especially smart cards, managed jointly by the International Organization for Standardization (ISO) and the International Electrotechnical Commission (IEC). There are other standards, however, such as ISO/IEC 14443 for contactless cards (PayPass, PayWave, ExpressPay). A further standard ISO/IEC 7810 ID-1, with which most credit cards are compliant, defines dimensions as 85.60×53.98 mm (3.370×2.125 in) and a thickness of 0.76 mm (0.030 in).

Furthermore, the terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A transaction card, comprising:
    a body including a first main side opposite a second main side, wherein an identification chip is coupled to the body; and
    a living hinge connecting a first section of the body and a second section of the body, wherein the living hinge extends between the first and second main sides of the body, wherein the first and second sections of the body are pivotable about the living hinge between a stowed configuration and a deployed configuration, and wherein the living hinge comprises:
        a middle layer between the first main side and the second main side, wherein a first surface of the middle layer defines a first indentation extending towards the second main side, and wherein a second surface of the middle layer defines a second indentation extending towards the first main side; and
        a stiffening feature extending from the first section or the second section of the body, wherein the middle layer overlaps the stiffening feature.

2. The transaction card of claim 1, the body defined by a perimeter including a first side opposite a second side and a first end opposite a second end, wherein a first dimension extending between the first and second ends is greater than a second dimension extending between the first and second sides.

3. The transaction card of claim 2, wherein the living hinge extends from the first end to the second end.

4. The transaction card of claim 1, wherein a first plane defined by the first main side of the body is parallel to a middle plane defined by the middle layer when the first and second sections of the body are in the deployed configuration.

5. The transaction card of claim 1, wherein the stiffening feature extends across the first indentation or the second indentation.

6. The transaction card of claim 5, wherein the stiffening feature is integrally formed with the first section, and wherein the stiffening feature comprises an angled free end surface in abutment with a corresponding angled surface of the second section when the body is in the deployed configuration.

7. The transaction card of claim 1, wherein the living hinge comprises a plurality of slots extending between the first and second main sides of the body.

8. The transaction card of claim 1, wherein the identification chip is coupled to the first main side of the body, and wherein a magnetic stripe is disposed along the second main side of the body.

9. A transaction card, comprising:
    a body including a first main side opposite a second main side, wherein an identification chip is coupled to the first main side of the body; and
    a living hinge connecting a first section of the body and a second section of the body, wherein the living hinge extends between the first and second main sides of the body, wherein the first and second sections of the body are pivotable about the living hinge between a stowed configuration and a deployed configuration, wherein in the deployed configuration the first and second sections of the body are coplanar with one another; and wherein the living hinge comprises:

a middle layer between the first main side and the second main side, wherein a first surface of the middle layer defines a first indentation extending towards the second main side, and wherein a second surface of the middle layer defines a second indentation extending towards the first main side; and a stiffening feature extending from the first section or the second section of the body, wherein the middle layer overlaps the stiffening feature.

10. The transaction card of claim 9, the body defined by a perimeter including a first side opposite a second side and a first end opposite a second end, wherein a first dimension extending between the first and second ends is greater than a second dimension extending between the first and second sides.

11. The transaction card of claim 10, wherein the living hinge extends entirely between the first end and the second end.

12. The transaction card of claim 9, wherein a first plane defined by the first main side of the body is parallel to a middle plane defined by the middle layer when the first and second sections of the body are in the deployed configuration.

13. The transaction card of claim 9, wherein the stiffening feature extends across the second indentation, and wherein an exterior side of the stiffening feature is coplanar with the second main side of the body.

14. The transaction card of claim 9, wherein the living hinge comprises a plurality of slots extending through the body, between the first and second main sides of the body.

15. A transaction card, comprising:
a body including a first main side opposite a second main side, wherein an identification chip is coupled to the first main side of the body; and a living hinge between a first section of the body and a second section of the body, the living hinge including a first indentation in the first main side and a second indentation in the second main side, wherein the first and second indentations extend towards one another, wherein the first and second indentations are separated by a middle layer extending between the first and second sections of the body, wherein the middle layer is between the first main side and the second main side, wherein the first and second sections of the body are pivotable about the living hinge between a stowed configuration and a deployed configuration in which the first and second sections of the body are coplanar with one another, wherein the living hinge further comprises a stiffening feature extending from the first section or the second section of the body, and wherein the stiffening feature and the middle layer overlap one another.

16. The transaction card of claim 15, wherein the stiffening feature extends across the second indentation, and wherein the stiffening feature is coplanar with the second main side of the body.

17. The transaction card of claim 16, wherein the stiffening feature is integrally formed with the first section, and wherein the stiffening feature comprises an angled free end surface in abutment with a corresponding angled surface of the second section when the body is in the deployed configuration.

* * * * *